Aug. 11, 1925.  
G. H. BARTLETT  
AUTOMATIC TUBE MAKING MACHINE  
Filed Dec. 10, 1924  
1,549,429  
3 Sheets-Sheet 3
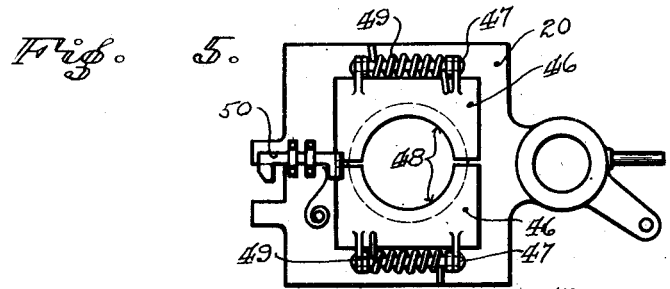
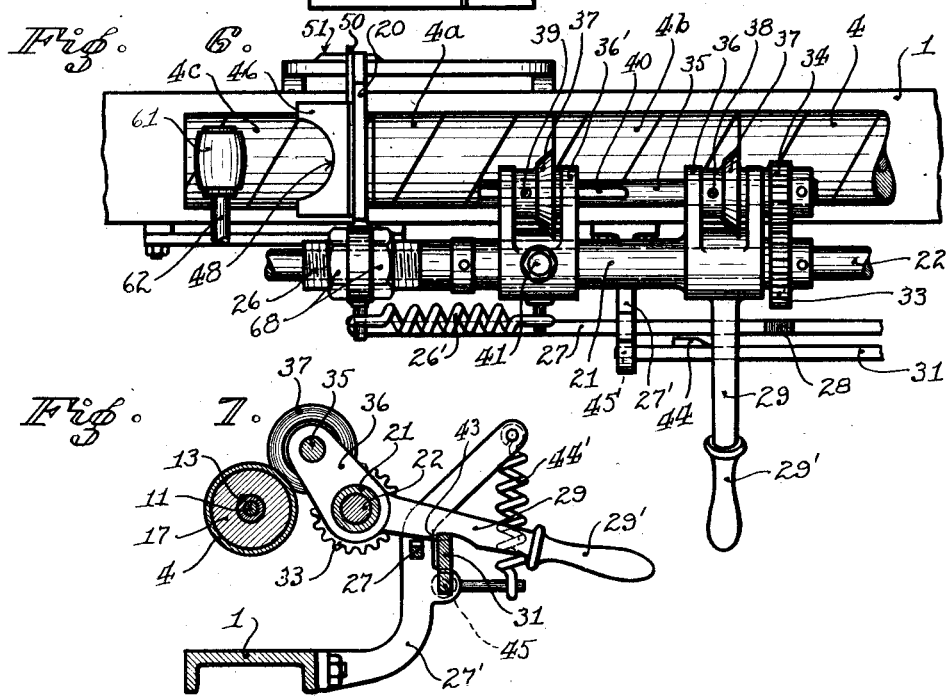
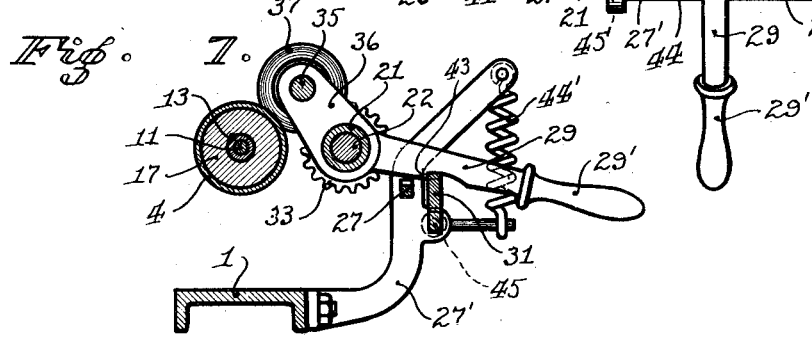
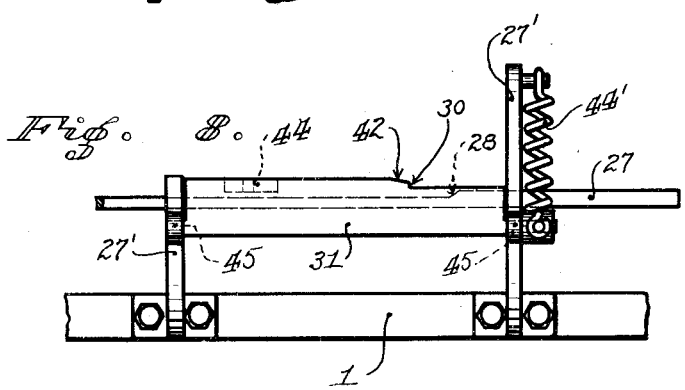
INVENTOR  
George H. Bartlett  
BY  
Booth & Booth  
ATTORNEYS Patented Aug. 11, 1925.

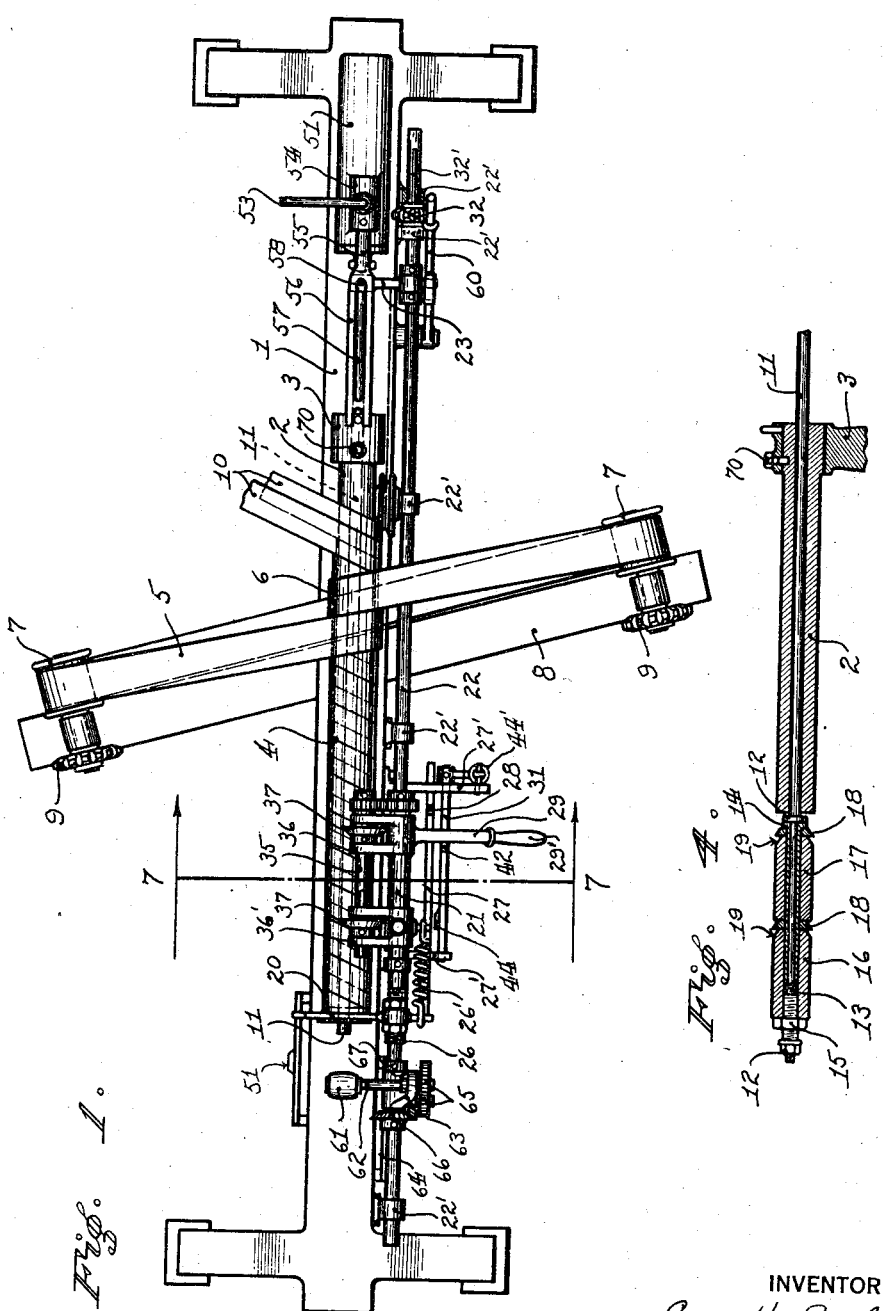

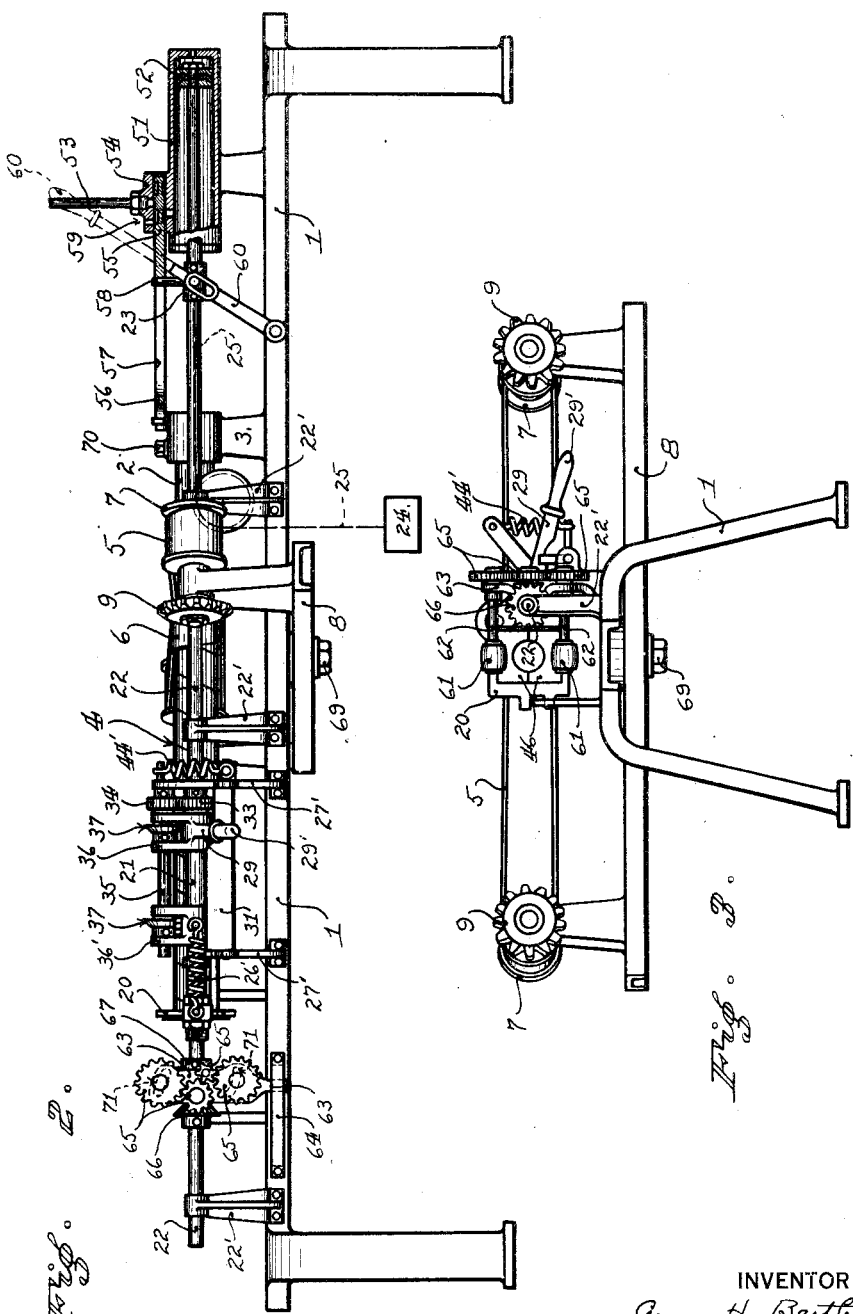

1,549,429

UNITED STATES PATENT OFFICE.

GEORGE H. BARTLETT, OF SAN FRANCISCO, CALIFORNIA.

AUTOMATIC TUBE-MAKING MACHINE.

Application filed December 10, 1924. Serial No. 754,948.

*To all whom it may concern:*

Be it known that I, GEORGE H. BARTLETT, a citizen of the United States, residing at the city and county of San Francisco, and State of California, have invented certain new and useful Improvements in Automatic Tube-Making Machines, of which the following is a specification.

My invention relates to machines for making helically wound tubes from ribbons of suitable material, such for example as paper. Such tubes are used principally for mailing or shipping purposes, the bodies of cylindrical cartons, and for other well known uses.

It is customary in the art to wind the ribbon or strip helically into a continuous tube, and to provide means associated with the winding mechanism for cutting off the tube, roughly, into relatively long sections, say of several feet each. Such sections of tubing are then conveyed to a separate machine in which they are cut into shorter sections of the desired length. This necessitates the use of two machines, with provision for transferring the relatively long sections of tubing from one to the other, and may also involve considerable waste in case the long sections cannot be evenly divided into the final tubes of the desired length.

The principal object of my invention, therefore, is to provide a single, automatic machine which is capable of continuously forming or winding the tubing, and of cutting it, as formed, into sections of any desired length suitable for final disposition. A further object of my invention is to provide means for removing the cut tubes from the machine in such a manner that they may be fed, if desired, directly into some other machine for carrying out a subsequent process, such for example, as applying ends to form cartons. Still further objects are to provide a machine which is entirely automatic in its action, requiring no attention on the part of an operator, and which operates swiftly and accurately; to provide means for adjusting the cutting mechanism in order to form tubes of any desired length; and to provide cutting means capable of making clean cuts, so that the tubes, when discharged from the machine, are in a finished condition.

It is to be understood that the form and construction of the machine herein shown and described may be varied, within the limits of the claims hereto appended, without departing from the spirit of the invention as set forth in said claims.

With this in view my invention will now be fully described with reference to the accompanying drawings, wherein:—

Fig. 1 is a plan view of my complete machine.

Fig. 2 is a part sectional side elevation thereof.

Fig. 3 is an end elevation as viewed from the left of Figs. 1 and 2.

Fig. 4 is a longitudinal section of the forming horn and the cutting mandrel.

Fig. 5 is an end elevation, enlarged, of the pusher plate with its releasable gates.

Fig. 6 is a detailed plan view, enlarged, of the cutting and ejecting mechanism, showing the positions of the parts at the end of the cutting operation.

Fig. 7 is a transverse section taken in the direction of the arrows on the line 7—7 of Fig. 1 and enlarged.

Fig. 8 is a detailed side elevation, enlarged, of the carriage controlling members.

In the drawings, the reference numeral 1 designates a bed or frame upon which the various parts of the machine are mounted. A stationary cylindrical horn 2, Figs. 1 and 2, is secured by one end to a bracket 3 extending upwardly from said bed, and upon said horn the tube 4 is formed or wound in any well know manner. For example, and as an illustration of a preferred method of winding, I have shown a substantially horizontal endless belt 5, set at an incline to the axis of said horn, and having a loop or bight thereabout, as shown at 6. Said belt runs over end pulleys 7, Figs. 1, 2 and 3, suitably mounted upon an angularly disposed frame 8 secured to the bed 1, and driven by sprockets 9 from any suitable source of power, not shown.

The ribbons or strips 10, Fig. 1, from which the tube is formed, are fed between the bight 6 of the belt 5 and the fixed horn 2. There are two such ribbons shown in the drawings, but the number used is optional. It is understood that said ribbons are suitably coated with adhesive material, in the usual manner, before being fed into the machine, and it is also understood that the angularity of the belt 5 and the aggregate width of the ribbons 10 are so related as to cause said ribbons to overlap, when helically wound about the horn 2 by said belt, so that their edge portions adhere to form the continuous, cylindrical tube 4. Therefore, as long as the belt 5 runs about said horn, and the ribbons 10 are fed therebetween, the tube 4 will be continuously formed and advanced, toward the left as viewed in Fig. 1, upon said horn.

A rod 11, Figs. 1 and 4, is slidably mounted axially within the horn 2. Said rod is provided with spaced collars or flanges 12, Fig. 4, one of which is removable, as shown. Between said collars there is mounted upon the rod 11 a rotatable mandrel 13, provided with a fixed flange 14 at one end and a removable flange or nut 15 screwed upon its other end, and annular spacers 16 and 17, which are clamped upon said mandrel by said flanges 14 and 15, as shown. Circular cutters 18, of a diameter suitable to enable the tube 4 to pass over them, are clamped, one between the spacer 17 and the flange 14, and the other between the spacers 16 and 17. The diameter of said spacers is approximately the same as that of the cutters 18, and they are provided with beveled ends 19 adjacent the cutting faces of said cutters, as shown.

The tube 4 advances continuously, with a helical motion, over the rotatable mandrel 13 above described, until its forward end comes in contact with a pusher plate 20, Figs. 1 and 2. Said pusher plate is secured to a carriage 21 which is carried by a shaft 22 slidably mounted in guides 22' secured to the bed 1, and adapted for movement in a direction parallel to the rod 11. Said shaft is connected with said rod by a bracket 23 at the rear end of the machine, so that both are compelled to move together. When the advancing end of the tube 4 comes in contact with the pusher plate 20, said plate, with the carriage 21, the shaft 22, the rod 11, and the mandrel 13 with its cutters 18, all advance together with said tube. In order to prevent the end of the tube 4 from being damaged by too great pressure against the pusher plate 20, some suitable means, such as a weight 24, Fig. 2, connected by a cable indicated at 25 with the rod 11 is provided to assist in advancing the carriage 21 and its associated parts. Said weight is slightly more than sufficient to overcome the friction of said carriage, so that the latter, if it were free to move, would be advanced slowly by said weight, at a speed somewhat less than that of the advancing tube 4. Said tube, therefore, by its contact with the pusher plate 20, has only to control the advance of said carriage by increasing its speed.

In order to prevent the weight 24 from moving the carriage 21 forward at the wrong time, there is provided a latch mechanism which locks said carriage in its normal position until released by the initial movement of the pusher plate 20. For this purpose said pusher plate is mounted upon a sleeve 26, Fig. 6, surrounding the shaft 22 and connected with the carriage 21 by a spring 26' which normally holds said sleeve in contact with said carriage, as shown. The plate 20 has secured to it a bar 27, which is slidably mounted in fixed guides 27', Figs. 1, 6, 7, and 8, and has a limited longitudinal movement with respect to the carriage 21. Said bar is provided with a cam surface 28 which engages and lifts an arm 29 extending laterally from said carriage, the latter being freely oscillatable upon the shaft 22. The outer end portion of said arm may be provided with a handle 29', by means of which the carriage 21 may be oscillated by hand when necessary. Said arm is adapted to engage a shoulder 30, Fig. 8, formed upon a member 31, carried by the fixed brackets 27' and therefore having no longitudinal movement upon the bed 1, and by such engagement the forward movement of the carriage 21 is prevented until the arm 29 is first raised, by the initial forward movement of the pusher plate 20 acting through the bar 27 and its cam surface 28. When said arm 29 is released from the shoulder 30 by the action of said cam surface 28, the carriage 21 is free to move forward, and, impelled by the weight 24 and the pressure of the advancing tube 4 against the pusher plate 20, advances with said tube.

The shaft 22 is continuously rotated by any suitable means, as for example a sprocket 32 slidably secured thereupon by a key 32', as shown in Fig. 1. A gear 33, Figs. 2 and 6, is secured upon said shaft, and meshes with a gear 34 secured upon a cutter shaft 35, Figs. 6 and 7, which is journaled in arms 36 and 36' extending from the carriage 21, and is positioned parallel to the axis of the mandrel carried by the rod 11. Said cutter shaft carries spaced circular cutters 37, Figs. 1, 2 and 6, positioned to cooperate with the mandrel cutters 18 with a shearing action to cut the tube 4. One of the cutters 37 is preferably secured upon the cutter shaft 35 by means of a pin 38, Fig. 6, and the other is slidable upon said shaft, having a key or pin 39 adapted to engage a slot 40 in said shaft to cause it to rotate therewith. The carriage arm 36', which is bifurcated to straddle the slidable cutter, as shown, is longitudinally adjustable upon the carriage 21 and is retained thereupon as by a set screw 41.

The carriage 21 can be rocked upon its shaft 22, to carry the cutters 37 into and out of cutting relation with the mandrel cutters 18. To accomplish this rocking of said carriage, the bar member 31 is formed with an inclined or cam surface 42, Figs. 1 and 8, immediately forward of its latch shoulder 30, upon which the carriage arm 29 rides, and by which it is elevated as the carriage 21 begins to advance, thereby depressing the cutters 37 into functional position. In this position, the positively rotated cutters 37 cooperate with the mandrel cutters 18, which are rotated with the mandrel by the friction of the rotating tube 4, to cut a pair of sections 4ª and 4ᵇ from the end portion of said tube, as shown in Fig. 6. It must be remembered that the carriage 21 with its cutters 37, the mandrel cutters 18, and the tube 4 itself, are all advancing together at the same speed, so that the cuts made in said tube are transverse, as shown.

This advancing and cutting action continues until the tube 4 has made one complete revolution, so that the sections 4ª and 4ᵇ are completely severed therefrom. Then, as the carriage 21 approaches the forward end of its travel, a shoulder 43, Fig. 7, of the arm 29 contacts with a laterally offset cam surface 44, Fig. 6 formed upon the member 31, and by such contact forces said member to swing outwardly against the tension of a spring 44', or toward the right as viewed in Fig. 7, said member being pivotally mounted, for such swinging movement, in the brackets 27', as shown at 45, in Figs. 7 and 8. This outward movement of the member 31 allows the arm 29 to drop, thereby raising the carriage cutters 37 out of cutting position.

As soon as the above described action is completed, the pusher plate 20 releases the end of the advancing tube section 4ª in the following manner:—

Said pusher plate is provided with a pair of oppositely mounted sections or gates 46, Figs. 5 and 6, pivoted thereto at 47, Fig. 5, and adapted to swing forwardly therefrom. Said sections or gates, which are notched as shown at 48 to provide a bearing for the rod 11, constitute the portion of the plate 20 against which the advancing tube section 4ª bears. They are normally held in their closed position by springs 49, and are locked in such closed position, to receive the thrust of said tube section, by a latch member 50. As the plate 20 approaches the end of its forward travel, said latch 50 rides upon a stationary cam member 51, Figs. 1 and 6, and is thereby thrown out of engagement with the gates 46, which are thereupon free to open to permit the tube sections 4ª and 4ᵇ to pass between them, as illustrated in Fig. 6, wherein a previously cut section 4ᶜ is shown passing through said gates, and to permit the carriage 21 and its associated parts to be returned, rearwardly, to their original positions. During such return movement the member 31 is retained in its outward position by the contact of its flat side with the arm 29, the spring 44' being insufficient to raise said arm through the leverage imposed by said flat side. However, when the return movement of the carriage 21 carries the arm 29 over the low portion of the member 31, behind its latch shoulder 30, said spring 44' raises said member to its normal position. Thus the cutters 39 are maintained in inoperative position during the return movement of the carriage 21.

To accomplish this return movement, the rod 11 has associated with it, at the rear end of the machine, a pressure cylinder 51, Fig. 2, mounted upon the bed 1. Said rod extends through suitable packing, not shown, in the forward end of said cylinder, and is secured to a piston 52 operable therein. The cylinder 51 is single acting, fluid being admitted only to its forward end, to move the piston 52 and the rod 11 rearwardly. The fluid, under suitable pressure, is admitted to the cylinder 51 through a pipe 53 from any convenient source not shown, and is controlled in any suitable manner by the movements of the rod 11. For example, I have shown a three-way valve 54 in the fluid pipe 53, and the stem or movable member 55 of said valve is connected with a bar 56, Figs. 1 and 2, in which is formed a slot 57 lying parallel with the rod 11. A pin 58, secured to said rod, extends through said slot and operates therein. When the rod 11 reaches the forward end of its movement, the pin 58, by contact with the forward end of the slot 57 moves the bar 56 forwardly, thereby opening the valve 54 to admit fluid to the cylinder 51. Said fluid thereupon causes the rod 11 to move rearwardly, and when it reaches the rear end of its movement, the pin 58, by contact with the rear end of the slot 57, again operates the valve 54, this time to close the pressure fluid supply and to permit the fluid within the cylinder 51 to escape through an outlet 59, Fig. 2. A hand lever 60, Figs. 1 and 2, may be provided upon the bracket 23 connecting the rod 11 with the shaft 22, for moving said rod and shaft and their associated parts by hand when desired.

When the gates 46 of the pusher plate 20 are released, and said plate travels rearwardly with the carriage 21 and its associated parts, the advancing tube sections 4ª and 4ᵇ force said gates open and pass therethrough. The foremost section 4ª is then engaged by a pair of oppositely disposed ejecting rolls 61, Figs. 3 and 6, and its advance thereby continued to carry it out of the machine to any desired place of deposit not shown. In Fig. 6 of the drawings I have shown a previously cut section 4ᶜ being ejected by the rolls 61. The said section 4ª is next engaged and ejected by said rolls and the last section 4ᵇ is similarly ejected in turn. The rolls 61 are preferably faced with some suitable material, such as rubber, to enable them to frictionally engage the tube sections, and are carried upon shafts 62 journaled in a bracket 63, Figs. 1 and 2, journaled about the shaft 22 and slidably mounted in a guide 64 secured to the bed 1. Said shafts 62 are driven, to rotate the rolls 61, by suitable gearing 65, Figs. 1, 2 and 3, from a gear 66 fixed upon the shaft 22. The bracket 63, carrying the rolls 61, travels with the said shaft 22 and the pusher plate 20, and for this purpose is journaled about said shaft between the gear 66 and a collar 67, both of which are secured to said shaft. The tube sections 4ᵃ and 4ᵇ are ejected, by the rolls 61, at a speed considerably greater than that of the advancing tube 4, so that there is time for the gates 46 of the pusher plate 20 to close and lock behind the second ejected section 4ᵇ, while said pusher plate is returning rearwardly with the carriage 21, before the advancing end of the tube 4 reaches said plate.

The operation of the machine may be described briefly as follows:—

The tube 4 is continuously formed by the action of the belt 5 in winding the ribbons 10 about the fixed horn 2, and is advanced, by said belt, with a helical motion. The forward end portion of said tube passes over the mandrel 13, rotating the same by frictional contact therewith, and abuts against the pusher plate 20. The initial movement of said plate, under the impulse of the advancing end of the tube 4, releases the lock of the carriage 21, permitting said carriage and its associated parts, viz the rod 11, the mandrel 13, the shaft 22 and the ejector rolls 61, to advance with said tube under the combined impelling forces of the weight 24 and the tube itself.

The forward movement of the carriage 21 causes its rotating cutters 37 to be depressed to cooperate with the mandrel cutters 18 to cut the sections 4ᵃ and 4ᵇ from the end of the tube 4 as the latter advances. At the conclusion of the cutting operation, the cutters 37 are raised out of engagement with the tube, the gates 46 of the pusher plate 20 are released to permit the cut tube sections 4ᵃ and 4ᵇ to pass therethrough and be ejected by the rolls 61, and the carriage and its associated parts are returned, by the fluid cylinder 51, to their original position, whereupon the advancing end of the tube 4 again abuts against the pusher plate 20 and the cycle of operations is repeated.

Thus the operation of the machine is entirely automatic, the tube 4 being continuously formed and the sections 4ᵃ and 4ᵇ being successively cut, in pairs, from its advancing end and ejected from the machine.

Adjustment of the machine to cut tube sections of various lengths can be easily accomplished in a variety of ways. For example, in the construction shown, the relative positions of the mandrel cutters 18 can be changed by removing the spacers 16 and 17 and substituting others therefor. The removal of the end flange 15 from the mandrel enables said spacers to be removed and replaced, and the entire mandrel can be removed endwise from the rod 11 to facilitate such change. One of the outside cutters 37 is adjustable upon the carriage 21, as described, by altering the position of the arm 36' upon the carriage 21, so that said cutters 37 can be spaced to correspond with the mandrel cutters 18.

Obviously, such adjustment of one of the outside cutters 37, and the corresponding adjustment of one of the inside cutters 18, will change the length of the cut tube section 4ᵇ. In order to make the length of the section 4ᵃ the same as that of the section 4ᵇ, I provide means for adjusting the position of the pusher plate 20 upon its sleeve 26, such for example as spaced clamping nuts 68, Fig. 6, so that the distance between said plate and the foremost of the cutters 37 is the same as the distance between the two cutters.

The machine may also be adjusted in other ways. For example, the angle between the belt carrying frame 8 and the bed 1 can be changed, to vary the angle of lead of the strips or ribbons 10, by loosening the nut 69, Figs. 2 and 3, by which said frame is secured to the bed. Again, the diameter of the tube made by the machine can be varied by substituting for the horn 2 and the mandrel 13 others of the proper diameter. Said mandrel is removable as described above, and the horn 2 may be removed by loosening the set screw 70, Figs. 1, 3 and 4, by which it is held in the bracket 3. When the size of the tube is varied, the spacing of the ejector rolls 61 must be correspondingly varied. Any convenient means may be employed for this purpose, but for the sake of illustration I have shown the shafts 62 of said rolls as mounted in arcuate slots 71, Fig. 2, formed in the bracket 63.

It is important to note that the two sections 4ᵃ and 4ᵇ are simultaneously cut from the end of the advancing tube. A greater number of sections may be simultaneously cut, merely by adding more cutters to the mandrel 13 and the shaft 35, and such action would be desirable if the cut sections were of very short length. The object in the simultaneous cutting of a plurality of sections is to give the carriage 21 and its associated parts ample time to return to their original positions at the conclusion of the cutting operation. By cutting two or more sections simultaneously from the end of the tube, said tube must advance a distance nearly equal to the aggregate length of such cut sections while the carriage is returning, whereas if only one section were cut at each stroke, the tube would only have to advance less than the length of one section while the carriage is returning. This feature is of great importance in enabling the machine to operate swiftly and to cut tube sections of short length.

It is also to be noted that the normal position of the carriage 21, in which it is locked by the engagement of the arm 29 with the shoulder 30, is somewhat forward of the extreme rearward position of said carriage. That is, the carriage is moved rearwardly, by the fluid cylinder 51, beyond its normal position, and is subsequently moved forwardly again, to said normal position, by the weight 24. This extra rearward movement of the carriage enables the ejector rolls 61 to engage the second or last tube section 4$^b$ somewhat earlier than would be the case of the rearward movement of said carriage terminated at its normal position, with the result that said last section 4$^b$ is ejected from the machine in time to enable the pusher plate gates 46 to close behind it, before the advancing end of the uncut tube portion reaches them. This feature also contributes to the speed of the machine, and to its ability to cut short sections.

It will readily be seen that, on account of the shearing action of the cutters 18 and 37, which are preferably knife-edged disks, the tube is cut cleanly, without ragged edges, so that the cut sections are in a finished condition, and need no further treatment to finish or smooth their ends. It will also be seen that the ejecting rolls 61 may be readily utilized to feed the tube sections into any other machine for carrying out a subsequent process thereupon.

I claim:—

1. A tube making machine comprising means for helically winding a tube from a ribbon and advancing said tube in the direction of its length; and means for simultaneously cutting a plurality of sections from the end of said tube during the advance thereof.

2. A tube making machine comprising means for forming a tube by helically winding a ribbon and for advancing said tube in the direction of its length; and means for simultaneously making a plurality of substantially transverse cuts in said tube during the advance thereof to divide it into sections.

3. A tube making machine comprising means for continuously forming a tube by helically winding a ribbon and for advancing said tube in the direction of its length; and means for cutting successive series of sections from the forward end of said tube during the advance thereof, each series consisting of a plurality of simultaneously cut sections.

4. A tube making machine comprising means for continuously advancing a formed tube in the direction of its length; and means for simultaneously cutting a plurality of sections from the end of said tube during the advance thereof.

5. A tube making machine comprising means for continuously forming a tube from one end and advancing said tube in the direction of its length; and means for simultaneously cutting a plurality of sections from the formed end of said tube during the advance thereof.

6. A tube making machine comprising means for continuously forming a tube from one end and advancing said tube in the direction of its length; and a plurality of cutters for simultaneously cutting sections from the formed end of said tube during the advance thereof.

7. A tube making machine comprising means for continuously forming a tube from one end and advancing said tube in the direction of its length; and a plurality of cutters adapted to advance with said tube and to cut simultaneously a plurality of sections from its formed end.

8. In a tube making machine, means for advancing a formed tube in the direction of its length; means for simultaneously cutting a plurality of sections from the end portion of said tube; and means actuated by the movement of said tube for advancing said cutting means therewith.

9. In a tube making machine, means for advancing a formed tube in the direction of its length; means for simultaneously cutting a plurality of sections from the end portion of said tube; means actuated by the movement of said tube for advancing said cutting means therewith; and means for returning said cutting means to its original position upon the completion of the cutting operation.

10. In a tube making machine, means for advancing a formed tube in the direction of its length; means for simultaneously cutting a plurality of sections from the end portion of said tube; means actuated by the movement of said tube for advancing said cutting means therewith; and fluid actuated means for returning said cutting means to its original position upon the completion of the cutting operation.

11. In a tube making machine, means for advancing a formed tube in the direction of its length; means for simultaneously cutting a plurality of sections from the end portion of said tube; means for advancing said cutting means with said tube; and means for automatically throwing said cutting means into and out of cutting position during the advancing movement thereof.

12. In a tube making machine, means for advancing a formed tube in the direction of its length; means for simultaneously cutting a plurality of sections from the end portion of said tube; means for advancing said cutting means with said tube; and means actuated by the advancing movement of said cutting means for throwing the same into and out of cutting position.

13. In a tube making machine, means for advancing a formed tube in the direction of its length; a cutter adapted to follow the advancing movement of said tube and to cut a section therefrom; means exerting a continuous force upon said cutter to advance the same; locking means for preventing the advance of said cutter; and means actuated by the advancing tube for releasing said locking means to allow said cutter to advance.

14. In a tube making machine, means for advancing a formed tube in the direction of its length; a carriage; a cutter carried thereby and adapted to cut a section from said tube; means for advancing said carriage at a speed not greater than that of said tube; and a member associated with said carriage and adapted for engagement by the advancing tube for preventing said carriage from lagging behind said tube.

15. In a tube making machine, means for advancing a formed tube in the direction of its length; a carriage; a cutter carried thereby and adapted to cut a section from said tube; weight actuated means for advancing said carriage during the cutting operation; and fluid actuated means for returning said carriage after the completion of said cutting operation.

16. In a tube making machine, means for forming a tube by helically winding a ribbon; a cutter positioned within the formed tube; and a second cutter exterior to the tube and adapted to cooperate with the interior cutter to cut a section from the formed end of the tube.

17. In a tube making machine, means for advancing a formed tube in the direction of its length; an interior cutter over which the tube advances; a second cutter exterior to the tube and adapted to cooperate with the interior cutter to cut a section from the advancing end of the tube; and means for advancing said cutters with said tube.

18. In a tube making machine, means for forming a tube by helically winding a ribbon; a rotatable cutter positioned within the formed tube; a second rotatable cutter exterior to the tube and adapted to cooperate with the interior cutter to cut a section from the formed end of the tube; and means for rotating one of said cutters.

19. In a tube making machine, means for advancing a formed tube in the direction of its length; a rotatable interior cutter over which the tube advances; a second rotatable cutter exterior to the tube and adapted to cooperate with the interior cutter to cut a section from the advancing end of the tube; means for rotating one of said cutters; and means for advancing said cutters with said tube.

20. In a tube making machine, means for advancing a formed tube with a helical motion in the direction of its length; a mandrel over which the formed end portion of said tube is advanced, said mandrel being rotatable and longitudinally movable to travel with the surrounding tube; and a cutter adapted to advance with said tube and to cooperate with said mandrel for cutting a section from the advancing end of said tube.

21. In a tube making machine, means for advancing a formed tube with a helical motion in the direction of its length; a mandrel over which the formed end portion of said tube is advanced, said mandrel being rotatable and longitudinally movable to travel with the surrounding tube; a cutter carried by said mandrel; and a second cutter adapted to advance with said tube and to cooperate with the first mentioned cutter to cut a section from the advancing end of said tube.

22. In a tube making machine, means for advancing a formed tube with a helical motion in the direction of its length; a mandrel over which the formed end portion of said tube is advanced, said mandrel being rotatable and longitudinally movable to travel with the surrounding tube; a pair of longitudinally spaced cutters carried by said mandrel; a second pair of spaced cutters adapted to advance with said tube and to cooperate respectively with the first mentioned cutters to cut a section from said tube; and means for adjusting the spacing of said cutters to vary the length of the cut tube section.

23. In a tube making machine, means for advancing a formed tube with a helical motion in the direction of its length; a mandrel over which the formed end portion of said tube is advanced, said mandrel being rotatable and longitudinally movable to travel with the surrounding tube; a pair of spaced cutters adapted to advance with said tube and to cooperate with said mandrel to cut a section from said tube; and means for adjusting the spacing of said cutters to vary the length of the cut tube section.

24. In a tube making machine, means for advancing a formed tube with a helical motion in the direction of its length; a mandrel over which the formed end portion of said tube is advanced, said mandrel being rotatable and longitudinally movable to travel with the surrounding tube; and a rotating cutter adapted to advance with said tube and to cooperate with said mandrel to cut a section from the end of said tube.

25. In a tube making machine, means for advancing a formed tube with a helical motion in the direction of its length; a longitudinally movable rod centrally positioned within the formed tube; a mandrel over which the formed tube is adapted to advance, said mandrel being rotatably mounted upon said rod; means for moving said rod to cause said mandrel to advance with said tube; means associated with said rod and adapted to advance with said mandrel to cooperate therewith to cut a section from the advancing end of said tube; and means for reversing the movement of said rod at the completion of the cutting operation to return said mandrel and said cutting means to their original positions.

26. In a tube making machine, means for advancing a formed tube in the direction of its length; a pair of spaced cutters adapted to cut a section from the advancing tube; and means for adjusting the spacing of said cutters to vary the length of the cut tube section.

27. A tube making machine comprising means for advancing a formed tube in the direction of its length; a travelling cutter adapted to advance with said tube and to cut a section from the end thereof; means for returning said cutter to its original position at the completion of the cutting operation; and means for adjusting the initial position of said cutter with respect to the advancing end of said tube to vary the length of the cut tube section.

28. In a tube making machine, means for advancing a formed tube in the direction of its length; a carriage adapted to advance with said tube; a cutter mounted upon said carriage for cutting a section from the end of the advancing tube; means for returning said carriage to its original position at the completion of the cutting operation; and means adapted to advance and return with said carriage for ejecting the cut tube section from the machine.

In testimony whereof I have signed my name to this specification.

GEORGE H. BARTLETT.